(12) United States Patent
Tharaldson et al.

(10) Patent No.: US 7,708,097 B1
(45) Date of Patent: May 4, 2010

(54) COMBINATION MOUNTING FEATURE AND COVER FOR ELECTRICAL COMPONENTS

(75) Inventors: Joseph D. Tharaldson, Roseau, MN (US); Jason A. Eichenberger, Warroad, MN (US)

(73) Assignee: Polaris Industries Inc., Medina, MI (US)

( * ) Notice: Subject to any disclaimer, the term of this patent is extended or adjusted under 35 U.S.C. 154(b) by 738 days.

(21) Appl. No.: 11/445,732

(22) Filed: Jun. 2, 2006

(51) Int. Cl.
*B62M 27/02* (2006.01)
*B62M 29/00* (2006.01)

(52) U.S. Cl. ..................................... 180/190
(58) Field of Classification Search ................. 180/190
See application file for complete search history.

(56) References Cited

U.S. PATENT DOCUMENTS

| | | | |
|---|---|---|---|
| 3,861,229 A | 1/1975 | Domaas | |
| 3,986,574 A | 10/1976 | Irvine | |
| 4,355,853 A | 10/1982 | Kourimsky | |
| 5,050,559 A | 9/1991 | Kurosu et al. | |
| 5,050,564 A | 9/1991 | Suzuki et al. | |
| 5,090,386 A | 2/1992 | Kurosu et al. | |
| 5,102,021 A | 4/1992 | Perea | |
| 5,172,675 A | 12/1992 | Kurosu et al. | |
| 5,179,503 A | 1/1993 | Fouts et al. | |
| 5,191,531 A | 3/1993 | Kurosu et al. | |
| 5,408,975 A | 4/1995 | Blakeslee et al. | |
| 5,479,909 A | 1/1996 | Blakeslee et al. | |
| 5,973,409 A | 10/1999 | Neibecker et al. | |
| 6,015,302 A | 1/2000 | Butts et al. | |
| 6,120,399 A | 9/2000 | Okeson et al. | |
| 6,176,796 B1 | 1/2001 | Lislegard | |
| 6,850,421 B2 | 2/2005 | Boyd | |
| 6,860,826 B1 | 3/2005 | Johnson | |
| 6,938,508 B1 | 9/2005 | Saagge | |
| 2004/0080923 A1 | 4/2004 | Janisch | |
| 2006/0162977 A1 | 7/2006 | Etou et al. | |
| 2007/0050095 A1* | 3/2007 | Nelson et al. .................. | 701/1 |

FOREIGN PATENT DOCUMENTS

| | | |
|---|---|---|
| JP | 2002-250412 | 9/2002 |
| JP | 2005-185009 | 7/2005 |

\* cited by examiner

*Primary Examiner*—Lesley Morris
*Assistant Examiner*—Marc A Scharich
(74) *Attorney, Agent, or Firm*—Baker & Daniels LLP

(57) ABSTRACT

An electrical center for a vehicle is disclosed. The electrical center may be positioned generally proximate to a continuously variable transmission. The electrical center may be covered with a cover. The cover may include a holder to hold a vehicle replacement component and/or a tool for use with a vehicle replacement component.

14 Claims, 10 Drawing Sheets

COMBINATION MOUNTING FEATURE AND COVER FOR ELECTRICAL COMPONENTS

FIELD OF THE INVENTION

The present invention relates generally to electrical systems for a vehicle and in particular to an electrical center for a vehicle and a cover for the electrical center.

BACKGROUND OF THE INVENTION

It is known to include in vehicles electrical components to provide a signal to an ignition member of an engine to ignite a combustible mixture in the engine or to control the operation of one or more accessories. Further, it is known to provide storage for various components including replacement components.

SUMMARY OF THE INVENTION

The present disclosure relates to vehicles, electrical systems for vehicles, and/or storage solutions for vehicles.

According to an illustrative embodiment of the present disclosure, a vehicle is provided. The vehicle including a frame; at least two ground engaging devices supporting the frame; an engine supported by the frame and providing power to at least one of the at least two ground engaging devices; an electrical center supported by the frame, the electrical center including a controller configured to control the operation of the engine; and a cover having an interior region to receive at least a portion of the electrical center including the controller. The cover including a holder configured to hold at least one of a vehicle replacement component and a tool for use with the vehicle replacement component. The vehicle replacement component corresponding to a vehicle component located outside of the interior region of the cover during use of the vehicle component on the vehicle.

According to another illustrative embodiment of the present disclosure, a vehicle is provided. The vehicle including a frame; at least two ground engaging devices supporting the frame; a seat supported by the frame; an engine supported by the frame and providing power to at least one of the at least two ground engaging devices; an electrical center supported by the frame. The electrical center including a plurality of electrical components grouped together including a controller configured to control the operation of the engine and an ignition source.

According to a further illustrative embodiment of the present disclosure, a vehicle is provided. The vehicle including a frame; an endless belt assembly; at least one front ground-engaging member; a straddle seat supported by the frame and generally positioned above the endless belt assembly; an engine supported by the frame and providing power to the endless belt assembly; a continuously variable transmission including a drive clutch coupled to the engine, a driven clutch coupled to the endless belt assembly and a drive belt coupled to the drive clutch and the driven clutch; and an engine control unit supported by the frame and positioned generally above the continuously variable transmission. The engine control unit being coupled to the engine and configured to control the operation of the engine.

According to yet another illustrative embodiment of the present disclosure, a method of changing a drive belt on a snowmobile is provided. The method includes the steps of carrying a replacement drive belt and a drive belt tool with a holder supported by a frame of the snowmobile, the holder being positioned on a first side of the snowmobile along with a drive clutch of the snowmobile and a driven clutch of the snowmobile. The method further includes the steps of removing the replacement drive belt and the drive belt tool from the holder; assembling the replacement drive belt to the drive clutch and the driven clutch with the aid of the drive belt tool; and returning the drive belt tool to the holder.

The above mentioned and other features of this invention, and the manner of attaining them, will become more apparent and the invention itself will be better understood by reference to the following description of embodiments of the invention taken in conjunction with the accompanying drawings.

BRIEF DESCRIPTION OF THE DRAWINGS

Corresponding reference characters indicate corresponding parts throughout the several views. Unless stated otherwise the drawings are proportional.

DETAILED DESCRIPTION OF EMBODIMENTS OF THE INVENTION

The embodiments disclosed below are not intended to be exhaustive or to limit the invention to the precise forms disclosed in the following detailed description. Rather, the embodiments are chosen and described so that others skilled in the art may utilize their teachings. For example, while the following description refers primarily to an electrical system and/or storage solution for a snowmobile, it should be understood that the principles of the invention apply equally to other electrical systems and/or storage solutions for other types of vehicles. While the present invention primarily involves a snowmobile, it should be understood, that the invention may have application to other types of vehicles such as all-terrain vehicles, motorcycles, watercraft, utility vehicles, scooters, golf carts, and mopeds.

Figure 1:
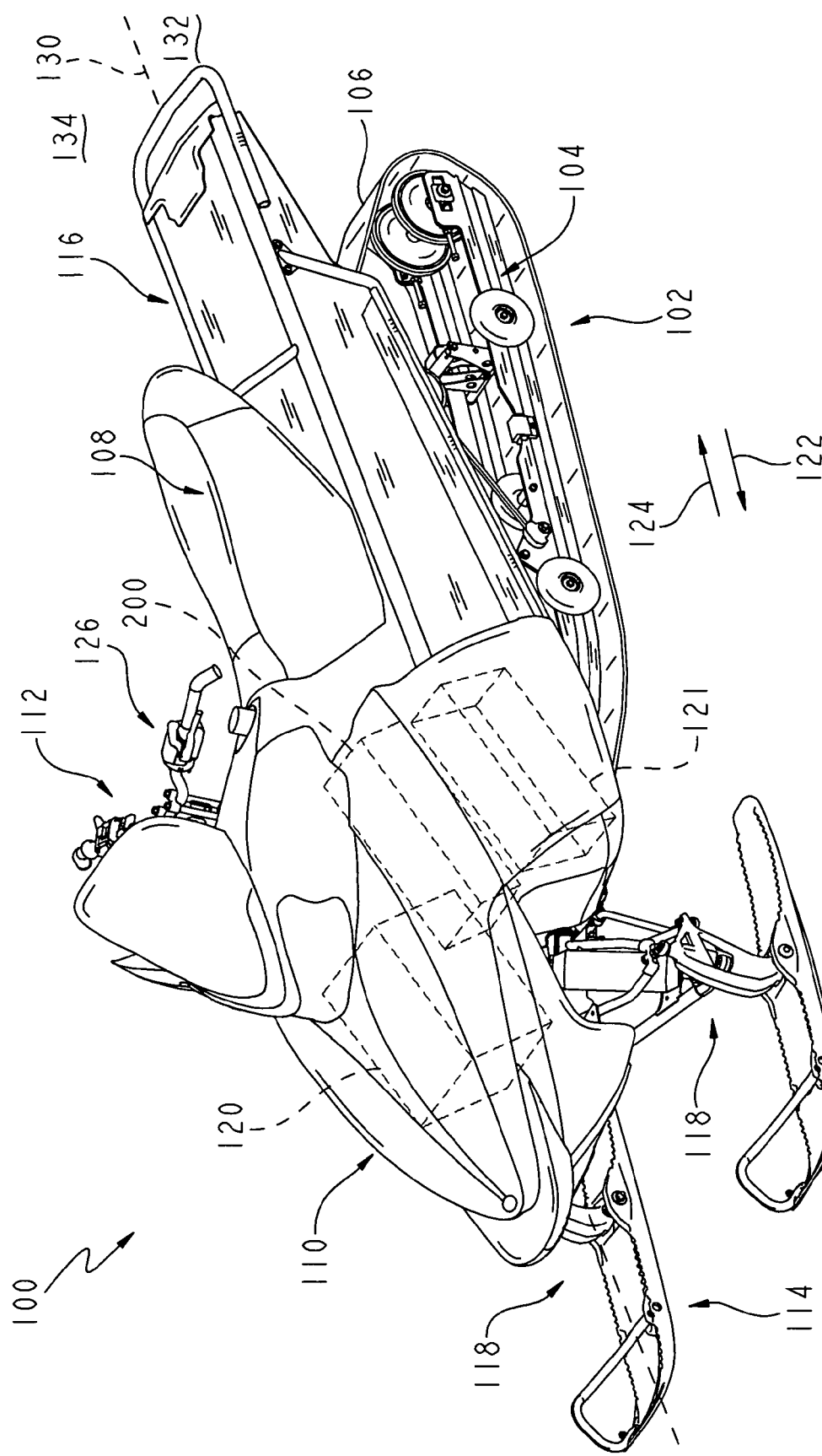
FIG. 1 is a perspective view of an exemplary snowmobile including an electrical center.

Referring to FIG. 1, one illustrative embodiment of a snowmobile 100 is shown. Snowmobile 100 includes a chassis 102, an endless belt assembly 104 including an endless belt 106, a seat 108, hood 110, steering assembly 112, front skis 114, frame 116, and front suspension assembly 118. Steering assembly 112 is operably coupled to front suspension assembly 118 and allows a rider to steer snowmobile 100. A motor 120, represented in phantom, is covered by hood 110 and provides power to a transmission 121, also represented in phantom, which provides power to endless belt assembly 104 to advance belt 106 in one of directions 122, 124 relative to the ground.

Front skis 114 and endless belt 106 are two types of ground engaging members. Other types of ground engaging members may be used with various vehicles including wheels with tires. Further, seat 108 is illustrated as a straddle seat. Other types of seats may be used with various vehicles including a seat to permit users to sit side-by-side, such as a bench seat. Steering assembly 112 is illustrated as a handlebar 126. Other types of steering assemblies may be used with various vehicles including a steering wheel.

Referring to FIG. 1, also represented in phantom is the location of an electrical center 200 of snowmobile 100. Electrical center 200 includes a variety of electrical components which as described herein interact with various components of snowmobile 100, including engine 120 and/or various accessories, such as lights, sensors, switches, heaters, and user indication devices like gauges or other instrument panel indicators. In one embodiment, engine 120 is Liberty series engine available from Polaris Industries, located at 2100 Highway 55, Medina, Minn. 55340. As illustrated in FIG. 1, electrical center 200 is located on a first side 132 of a centerline 130 of snowmobile 100. In one embodiment, electrical center 200 is located on a second side 134 of centerline 130. In another embodiment, electrical center 200 crosses centerline 130 and is located on both first side 132 and second side 134. In one embodiment, electrical center 200 is located at a location under hood 110 which is not proximate to an exhaust system (not shown) of snowmobile 100. In one example, electrical center 200 is located on first side 132 as illustrated and an exhaust system of snowmobile 100 receives hot gases from engine 120 which are the product of combustion at a remote location, such as on second side 134 or in a front portion of snowmobile 100 forward of engine 120 and dispels the hot gases at a remote location, such as on second side 134 of snowmobile 100 away from electrical center 200. In another example, the exhaust system is generally aligned with centerline 130 of snowmobile 100 and electrical center 200 is positioned remote from centerline 130, such as on first side 132, second side 134, or in a front portion of snowmobile 100 and on first side 132, second side 134, or on both first side 132 and second side 134.

Figure 2:
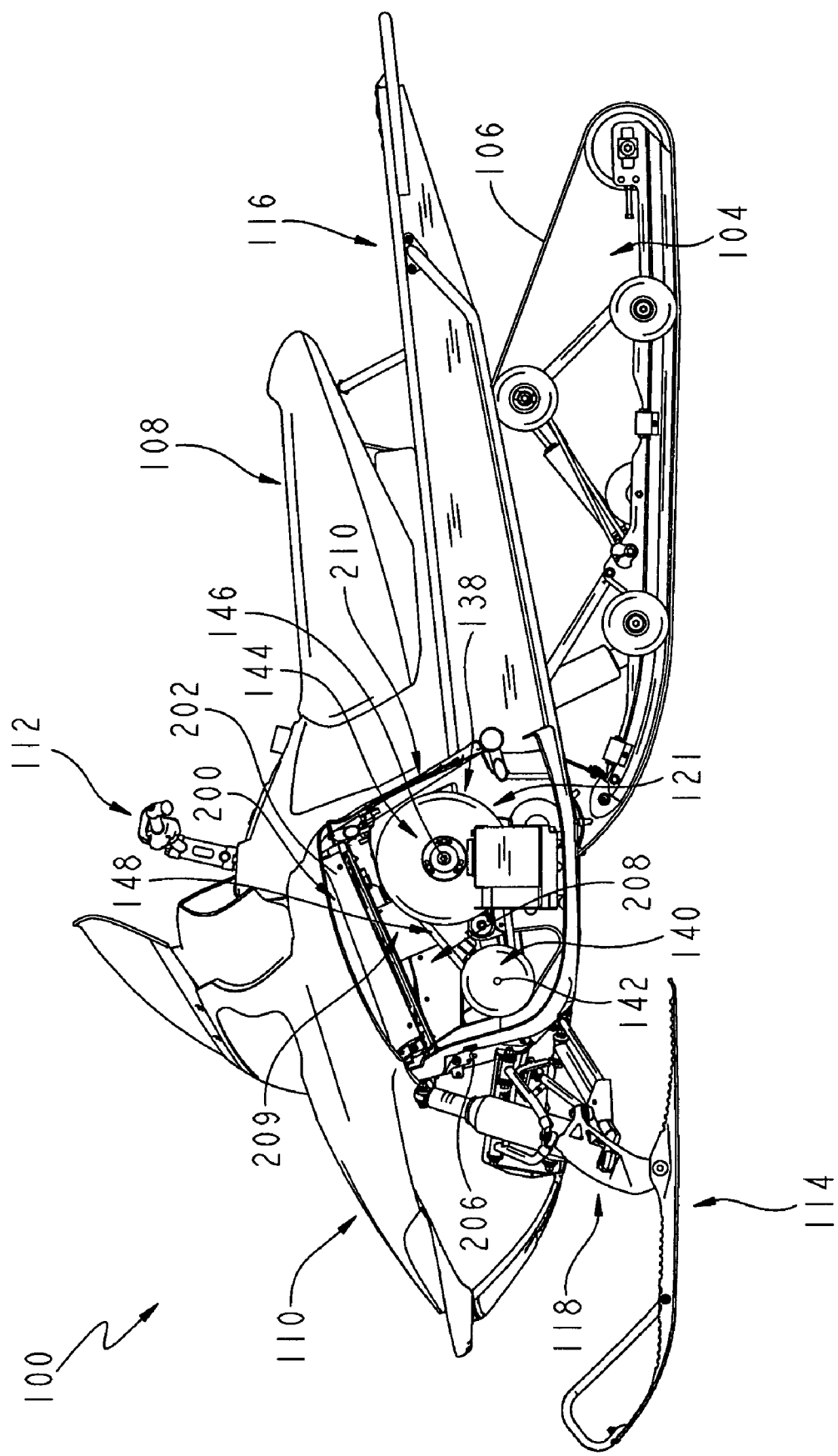
FIG. 2 is a side view of the snowmobile of FIG. 1 illustrating the location of the electrical center relative to a continuous variable transmission of the snowmobile.

Referring to FIG. 2, transmission 121 is illustrated as a continuous variable transmission ("CVT") 138. CVT 138 includes a drive member or drive clutch 140 having an input shaft 142 which is coupled to engine 120, a driven member or driven clutch 144 having an output shaft 146 which is coupled to endless belt assembly 104, and a drive belt 148 which couples driven member 144 to drive member 140. Engine 120 turns input shaft 142 of drive member 140 which causes the rotation of drive member 140. As drive member 140 rotates endless drive belt 148 advances causing driven member 144 to rotate. The rotation of driven member 144 causes the advancement of endless belt 106 thereby propelling snowmobile 100. In one embodiment, endless belt may be advanced in direction 124 relative to the ground propelling snowmobile forward in direction 122 or advanced in direction 122 relative to the ground propelling snowmobile rearward in direction 124.

Exemplary continuous variable transmissions are disclosed in U.S. Pat. No. 3,861,229; U.S. Pat. No. 6,176,796; U.S. Pat. No. 6,860,826; and U.S. Pat. No. 6,938,508, the disclosures of which are expressly incorporated by reference herein. Additional details about the illustrated driven member 144 are provided in U.S. Pat. No. 6,120,399, the disclosure of which is expressly incorporated by reference herein.

Figure 3:
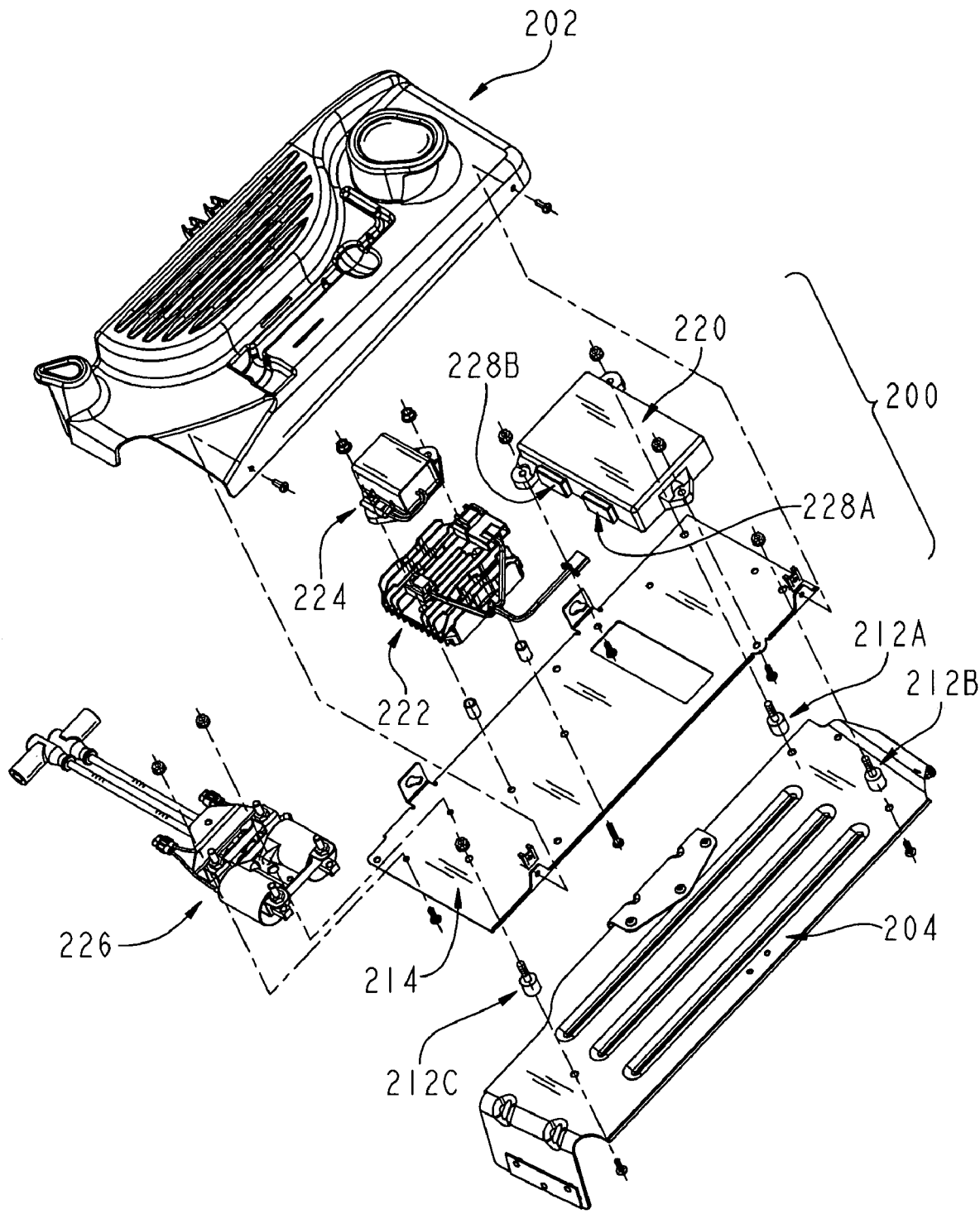
FIG. 3 is an exploded view of the electrical center of FIG. 2, associated cover and associated frame member.

Referring to FIG. 3, an exploded view of electrical center 200 is shown along with a cover 202, and a frame member 204. Illustratively, frame member 204 is a clutch guard that is positioned generally above CVT 138. Frame member 204 is coupled to three other frame members or body members 206, 208, 210 (illustrated in FIG. 2). Body member 206 forms a portion of the exterior body of vehicle 100. In one embodiment, frame member 204 is solidly mounted to frame members or body members 206, 208, 210. In one embodiment, frame member 204 is hingedly mounted to one frame member or body members 206, 208, 210 and is moveable relative thereto. Frame member 204 couples to frame member 208 through a frame member 209.

Frame member 204 includes three openings which receive vibration isolation fasteners 212A-C. Vibration isolation fasteners 212A-C are also received in a base member 214 of electrical center 200. In the illustrated embodiment, base member 214 is a secondary mounting plate or electrical mounting plate which is mounted to frame member 204 through vibration isolation fasteners 212A-C.

Electrical center 200 includes a plurality of electrical components, illustratively an engine control unit ("ECU") or controller 220, a voltage regulator 222, a capacitor 224, and a pair of ignition coils 226. Each of electrical components 220, 222, 224, and 226 are coupled to base member 214. ECU 220 is configured to control the operation of engine 120 and/or the operation of one or more accessories. Ignition coils 226 provide a signal to sparkplugs (not shown) attached to engine 120 through connectors 246A and 246B. In one embodiment, ignition coils 226 provide a signal to the sparkplugs in response to a signal from ECU 220. Voltage regulator 222 is configured to rectify and regulate three phase AC power from the alternator (not shown) into 14.4 volt DC power output. Capacitor 224 is configured to suppress voltage spikes on the DC power output.

ECU includes two connectors 228A and 228B which are coupled to a first end of a plurality of electrical cables. The plurality of electrical cables are coupled to a plurality of vehicle components at a second end. Exemplary vehicle components include engine 120, sensors, switches, diagnostic connectors, lighting, power distribution modules, injectors, ignition coils, exhaust valve solenoid, starter solenoid, and user indication devices. Exemplary sensors include sensors which provide information related to engine characteristics, environmental characteristics, and/or user inputs. Exemplary user indication devices include a display, a light, or other suitable indication devices. As explained herein, the electrical cables connected to connectors 228A and 228B are grouped into one or more harnesses 230, 236, 242.

Exemplary engine control systems such as ECUs are disclosed in U.S. Pat. No. 5,050,559; U.S. Pat. No. 5,050,564; U.S. Pat. No. 5,090,386; U.S. Pat. No. 5,172,675; U.S. Pat. No. 5,191,531; U.S. Pat. No. 5,408,975; and U.S. Pat. No. 5,479,909, the disclosures of which are expressly incorporated by reference herein.

In one embodiment, electrical center 200 includes power distribution electrical components, such as relays or fuses. In one embodiment, power distribution electrical components, such as relays or fuses, are provided at other location in vehicle 100, such as attached to one of harnesses 230, 236, 242.

Electrical center 200 provides electrical components 220, 222, 224, and 226 in a centralized location. In traditional snowmobiles, electrical components 220, 222, 224, and 226 are spaced apart in different locations of the snowmobile resulting in difficulty in assessing the working order of each component and causing an unattractive appearance under hood 110. By centralizing electrical components 220, 222, 224, and 226 into an electrical center, such as electrical center 200, the various components may be easily tested and serviced. Further, the appearance under hood 110 is improved because harnesses with fewer breakouts are needed.

The appearance is also improved through the inclusion of cover 202 which is placed over base member 214 and electrical components 220, 222, 224, and 226. In one embodiment, cover 202 is a molded plastic component. Cover 202 is moveable between a first position generally blocking access electrical components 220, 222, 224, and 226 (see FIGS. 4 and 5) and a second position generally permitting access to base member 214 and electrical components 220, 222, 224, and 226 (generally spaced apart, such as shown in FIG. 3). Cover 202 also provides protection to electrical components 220, 222, 224, and 226 when in the first position.

Figure 6:
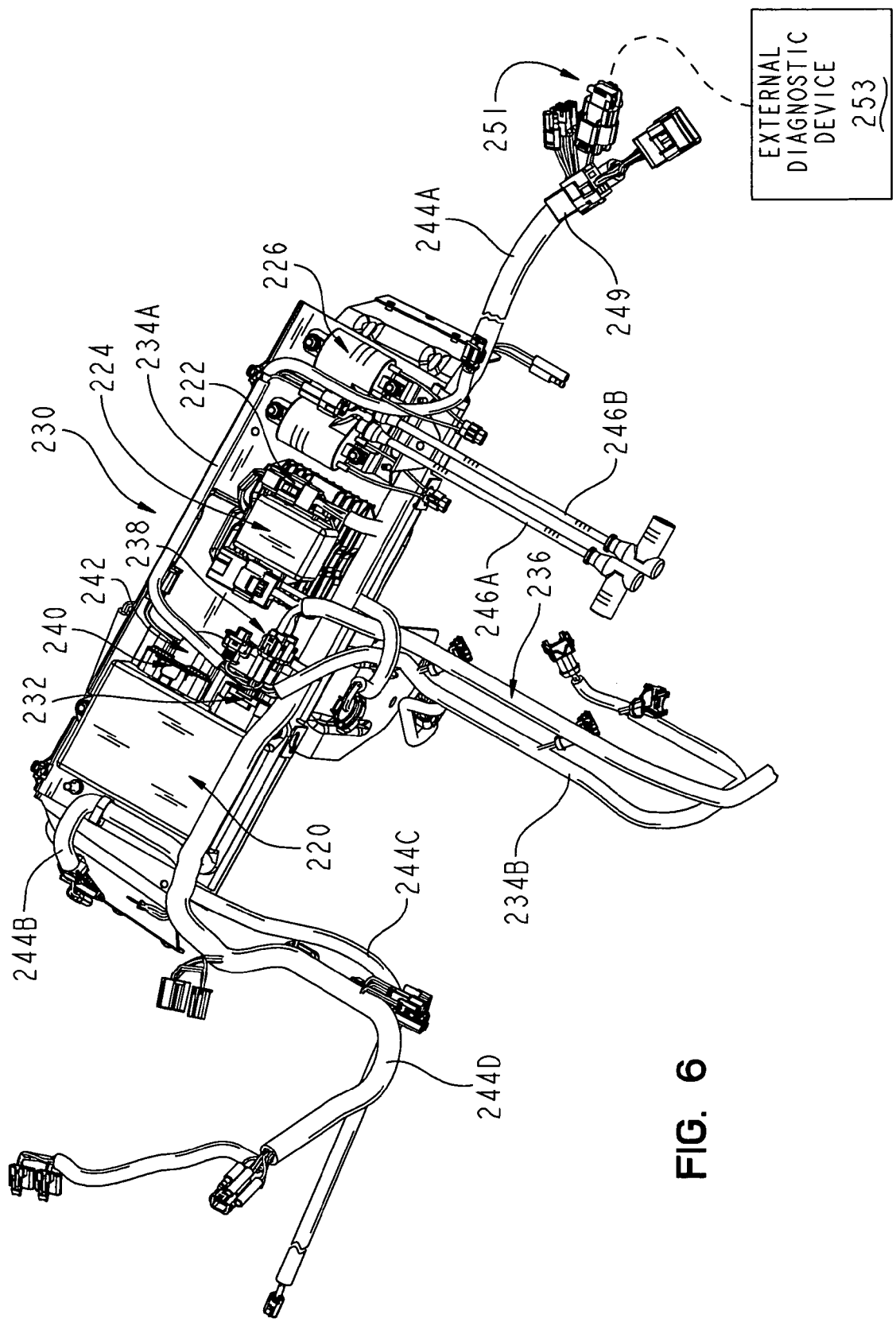
FIG. 6 is a perspective view of the assembly of FIG. 4 with the cover, vehicle replacement components and tools removed to illustrate the connections between the harnesses and the electrical center.
Figure 7:
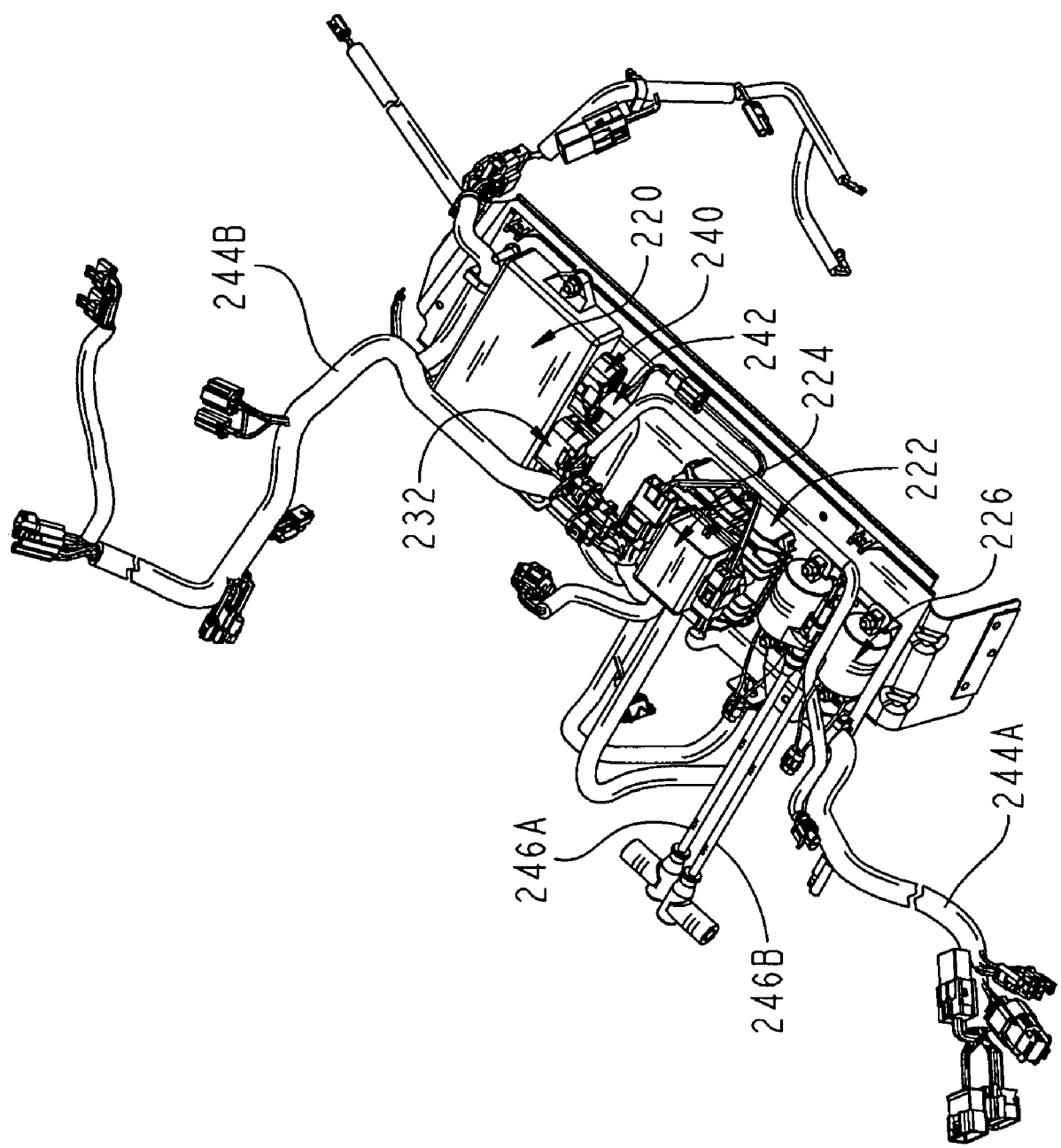
FIG. 7 is another perspective view of the assembly of FIG. 4 with the cover, vehicle replacement components and tools removed to illustrate the connections between the harnesses and the electrical center.

Referring to FIGS. 6 and 7, a first harness 230 is connected to connector 228B through a connector 232. First harness 230 includes a first leg 234A and a second leg 234B. The electrical cables of first leg 234A connect exhaust valve solenoid and ignition coils to ECU 220. The electrical cables of second leg 234B connect engine management sensors and injectors to ECU 220. In one embodiment, all connections between the engine 120 and the electrical center 200 are through a single harness. Further, connected to connector 232 is a connector 238 which couples a second harness 236 to ECU 220. The electrical cables of second harness 236 connect crank position sensors to ECU 220 and three phase power to voltage regulator 222.

A third harness 242 is connected to connector 228A through a connector 240. Third harness 242 includes a first leg 244A, a second leg 244B, a third leg 226C, and a fourth leg 226D. The electrical cables of first leg 244A connect diagnostics, power distribution module 249, and user indicator devices to ECU 220. The electrical cables of second leg 244B connect electric start control to ECU 220. The electrical cables of third leg 244C connect ground speed sensor to ECU 220. The electrical cables of fourth leg 244D connect switches, such as throttle safety and reverse, to ECU 220.

Figure 4:
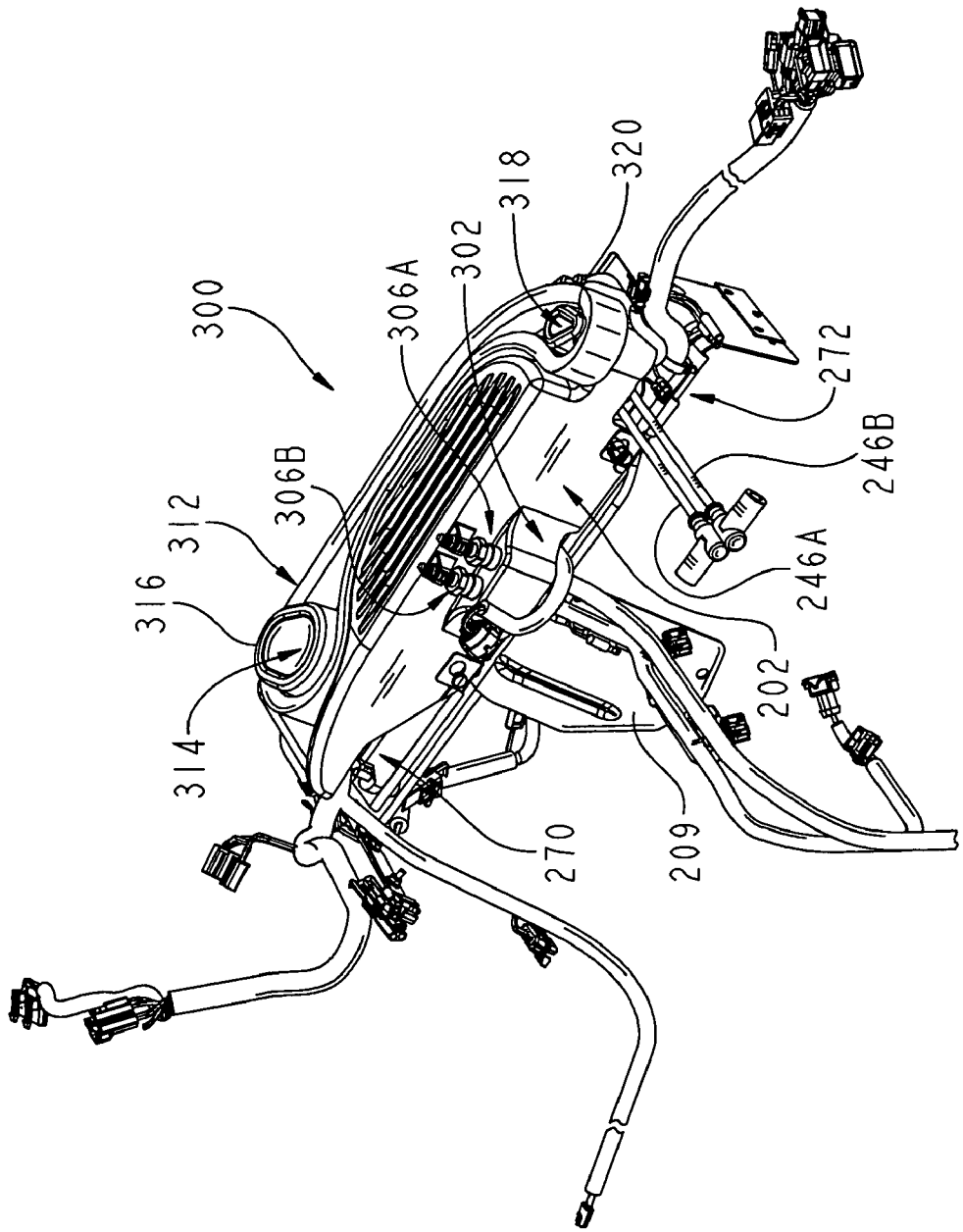
FIG. 4 is a perspective assembly view of the frame member, the electrical center and the cover of FIG. 3 along with associated harnesses, vehicle replacement parts, and tools.
Figure 5:
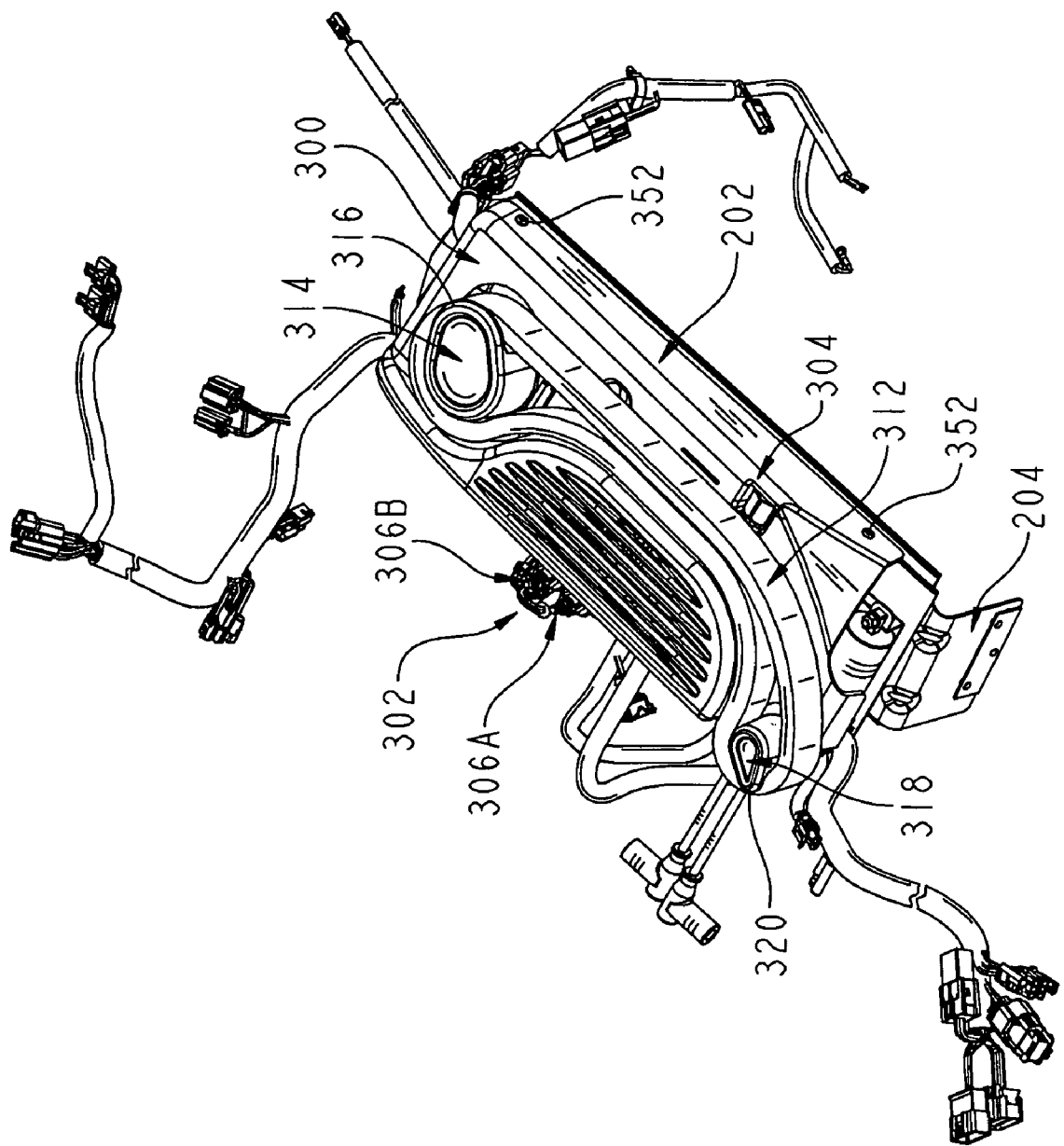
FIG. 5 is another perspective assembly view of the frame member, the electrical center and the cover of FIG. 3 along with associated harnesses, vehicle replacement parts, and tools.
Figure 8:
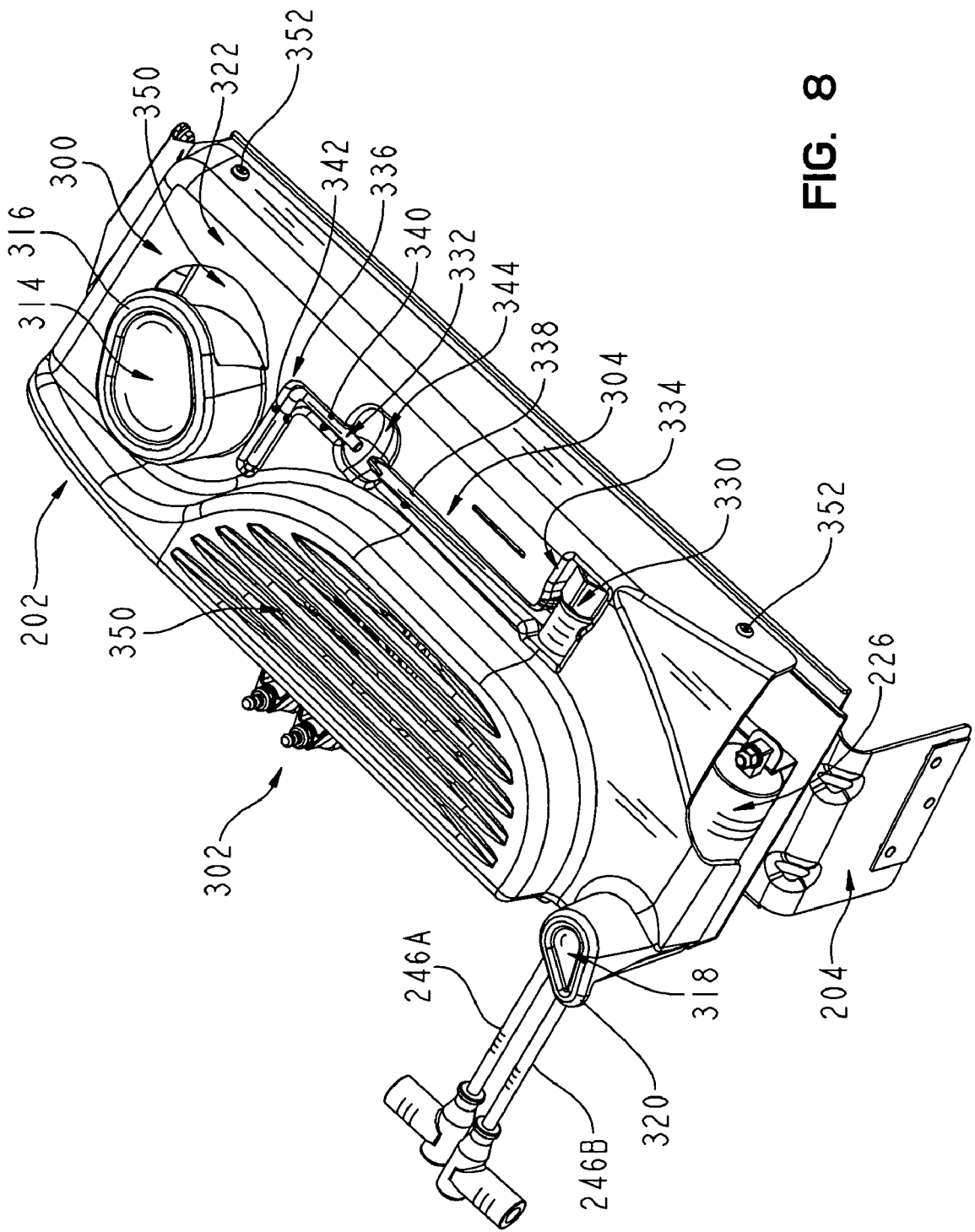
FIG. 8 is another perspective view of the assembly of FIG. 4 with a drive belt vehicle replacement component and harnesses removed to illustrate the holder portion for the tools
Figure 10:
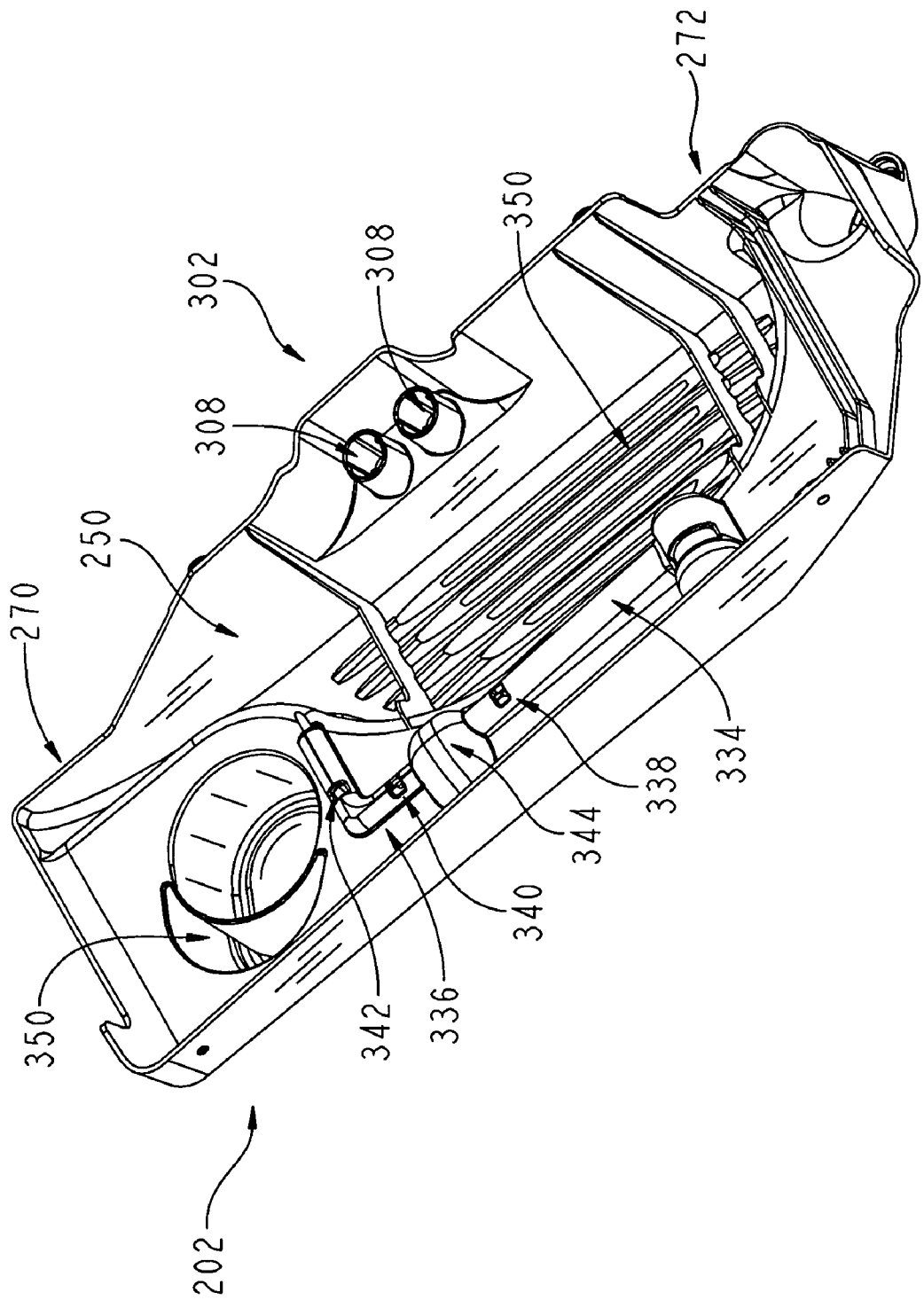
FIG. 10 is a bottom, perspective view of the cover of FIG. 4.

As shown in FIGS. 4 and 5, cover 202 receives electrical components 220, 222, 224, and 266 along with connectors 232, 238, and 240 within an interior region 250 (see FIG. 10) which provides a cleaner under hood appearance. Harnesses 230, 236, 242 exit cover 202 through cut-out regions 270, 272 of cover 202. Cover 200 is moveable between a first position illustrated in FIGS. 4 and 5 wherein electrical components 220, 222, 224, and 266 along with connectors 232, 238, and 240 are positioned within interior region 250 of cover 202 and a second position wherein electrical components 220, 222, 224, and 266 along with connectors 232, 238, and 240 are spaced apart from interior region 250 of cover 202. As shown in FIG. 8, cover 202 is coupled to base member 214 further couplers 352.

Figure 9:
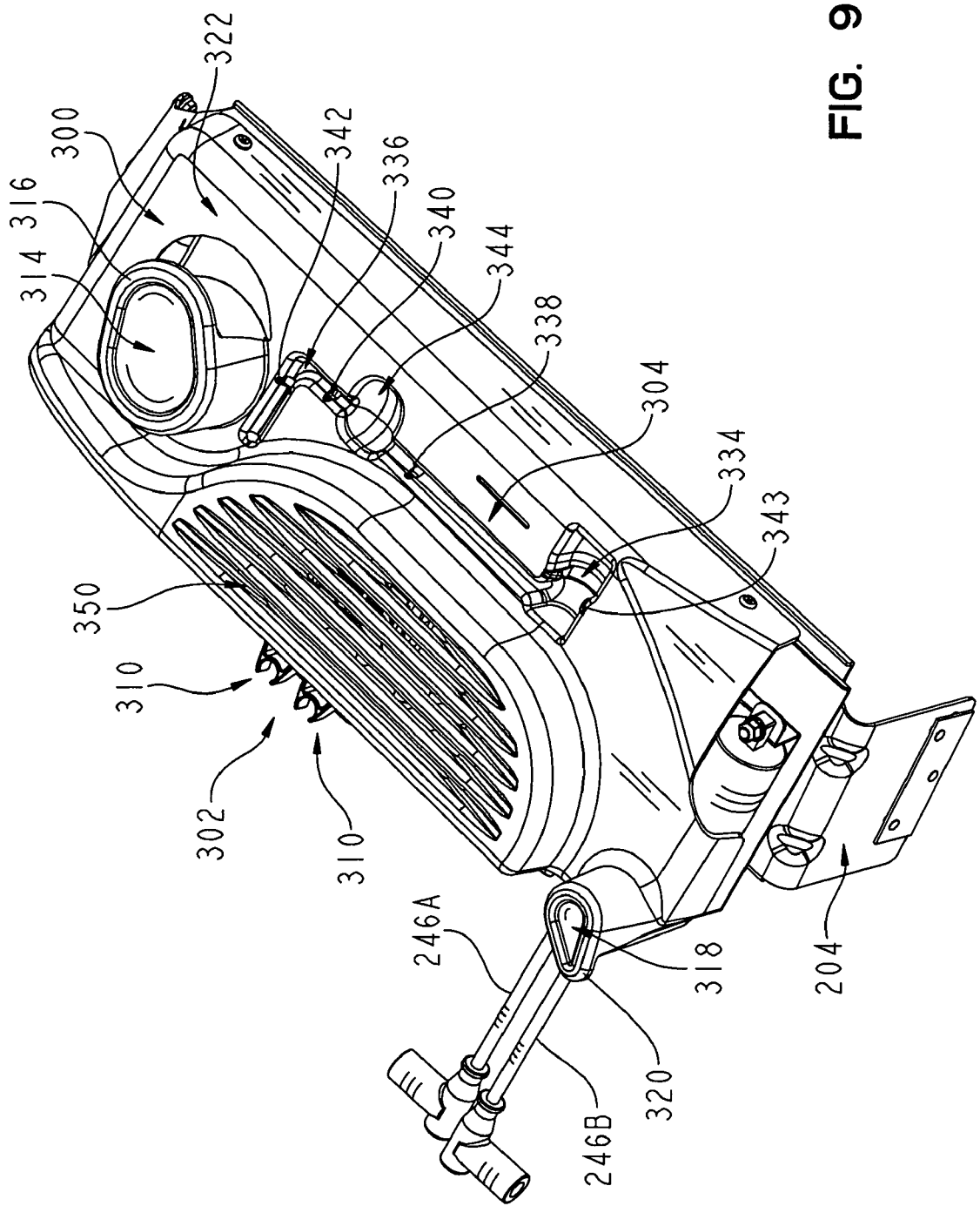
FIG. 9 is a perspective view of the assembly of FIG. 8; with a pair of spark plugs and tools removed.

Cover 202 further includes a plurality of holders 300, 302, and 304. Holder 300 is configured to hold a vehicle replacement component which replaces a component used outside of electrical center 200. Illustratively holder 300 is configured to hold a replacement drive belt 312. Holder 300 includes a first hub 314 having a tab portion 316 and a second hub 318 having a tab portion 320. Holder 300 is illustratively positioned in a recessed portion 322 (see FIG. 9) of cover 202. Replacement drive belt 312 is positioned around first hub 314 and second hub 318 for storage as shown in FIG. 5.

Holder 302 is also configured to hold a vehicle replacement component which replaces a component used outside of electrical center 200. Illustratively holder 302 is configured to hold sparkplugs 306A and 306B. Holder 302 includes a lower receptacle 308 to receive a portion of sparkplugs 306A and 306B and an upper portion 310 (see FIG. 9) to receive an upper portion of sparkplugs 306A and 306B.

Holder 304 is configured to hold one or more tools, such as tools used in the installation of vehicle replacement parts 306 and 312. Illustratively, a spark plug wrench 330 and a clutch tool 332 are shown. Wrench 330 and clutch tool 332 are each received in a respective recess 334, 336. Holder 304 includes snap features 338, 340, 342, and 343 which retain the respective one of wrench 330 and clutch tool 332 in the respective recess 334 and 336. An additional recess 344 is provided to provide clearance underneath wrench 330 and clutch tool 332 to remove each with a finger.

Holders 300, 302, and 304 are illustratively shown on the outside of cover 202. In one embodiment, one or more of holders 300, 302, and 304 are provided on an inside of cover 202. In addition, holders 300, 302, and 304 may be used to hold vehicle replacement components which are associated with electrical center 200 and/or tools for use with vehicle replacement components which are associated with electrical center 200. Further, in one embodiment, holder 300 may be configured to hold other items, such as safety items like and avalanche probe and/or beacon. Holders 300, 302, 304 secure the respective items such that the items do not easily move around relative to cover 202. In one embodiment, one or more of holders 300, 302, and 304 are storage bins which hold one or more of vehicle replacement components, tools, and/or other items.

Cover 202 further includes a plurality of vents 350 which permit the passage of air from an outside of cover 202 to interior region 250 of cover 202 and from interior region 250 of cover 202 to an outside of cover 202. The flow of air assists in providing cooling to electrical components 220, 222, 224, and 226 of electrical center 200.

Electrical center 200 is easily accessible to a user. A user may simply raise hood 110 and remove cover 202 to access electrical center 200. Such accessibility and the centralization of electrical components 220, 222, 224, and 226 reduces the cost of repairing vehicle 100. For instance, a user may easily swap out components, such as ECU 220, to determine if ECU 220 is faulty or not. If the problem is resolved then the user knows that ECU 220 was faulty, otherwise the original ECU may be once again assembled as part of electrical center 200. If ECU 220 was instead located in a hard to reach area of vehicle 100 potentially requiring the removal of one or more components to reach ECU 220, a user may swap out ECU 220 even though it is not the problem in an attempt to reduce the likelihood that the user would later have to swap out ECU 220. Such activity raises the cost of repairing vehicle 100 (labor and/or components) and assuming vehicle 100 is under warranty raises warranty costs.

In the illustrated embodiment, electrical center 200 further includes a connector 251 which may be coupled to an external diagnostic device 253 which is used to evaluate electrical center 200 and other components of vehicle 100. In one embodiment, connector 251 includes an eight-pin connector. As stated in U.S. Pat. No. 5,191,531, the disclosure of which is expressly incorporated by reference herein, when an abnormality occurs in the system during the driving of the vehicle 100, trouble data is stored and kept in a memory of electrical center 200. At a dealer's shop, an external diagnostic device is connected through the connector 251 to read the data stored in the memory of electrical center 200 for diagnosing the trouble of the system.

The inclusion of one or more of holders 300, 302, and 304 provides useful storage space. Further, as discussed herein in the illustrated embodiment, holder 302 holds a replacement drive belt 312 and holder 304 holds a clutch tool 332. Referring to FIG. 2, cover 202 is positioned generally proximate to CVT 138. By placing cover 202 proximate to CVT 138 the replacement of a broken drive belt is more convenient. As stated herein, holder 302 carries replacement drive belt 312 and holder 304 carries clutch tool 332. In order to replace a broken drive belt, a user removes the old drive belt if still attached to vehicle 100 and also removes replacement drive belt 312 from holder 302 and tool 332 from holder 304. Using tool 332 the user couples replacement drive belt 312 to drive clutch 140 and driven clutch 144. As such, the user may complete the replacement of the drive belt while staying on first side 132 of vehicle 100.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A vehicle including:
a frame;
at least two ground engaging devices supporting the frame;
an engine supported by the frame and providing power to at least one of the at least two ground engaging devices;
an electrical center supported by the frame, the electrical center including a controller configured to control operation of the engine; and
a cover having an interior region to receive at least a portion of the electrical center, including the controller, the cover including a holder configured to hold at least one of a vehicle replacement component and a tool for use with the vehicle replacement component, the vehicle replacement component corresponding to a vehicle component which is supported by the at least two ground engaging devices at a location outside of the interior region of the cover.

2. The vehicle of claim 1, wherein the vehicle replacement component is accessible from an exterior of the cover.

3. The vehicle of claim 2, further comprising a continuously variable transmission coupled to the engine and the at least one of the at least two ground engaging devices powered by the engine, wherein the vehicle replacement component is a drive belt for the continuously variable transmission.

4. The vehicle of claim 3, wherein the at least one of the at least two ground engaging members is an endless belt.

5. The vehicle of claim 1, wherein the cover is moveable between a first position wherein the controller is received in the interior of the cover and a second position wherein the controller is spaced apart from the interior of the cover.

6. The vehicle of claim 5, wherein the electrical center includes a connector positioned to interface with an external diagnostic device.

7. The vehicle of claim 1, wherein the holder is configured to hold both the vehicle replacement component and the tool.

8. The vehicle of claim 1, further comprising an electrical harness including a first connector configured to be connected to the controller and a second connector configured to be connected to the engine, the first connector being positioned within the interior region of the cover.

9. The vehicle of claim 8, further comprising:
a continuously variable transmission coupled to the engine and coupled to the at least one of the at least two ground engaging devices powered by the engine;
a straddle seat positioned above the at least one of the at least two ground engaging devices powered by the engine; wherein the at least one of the at least two ground engaging members is an endless belt.

10. The vehicle of claim 1, wherein the electrical center further includes an ignition coil which is electrically coupled to at least one sparkplug of the engine, the vehicle replacement part being at least one sparkplug.

11. A vehicle including:
a frame;
at least two ground engaging devices supporting the frame wherein at least one of the at least two ground engaging devices is an endless belt;
a straddle seat supported by the frame;
an engine supported by the frame and providing power to at least one of the at least two ground engaging devices;
a continuously variable transmission coupled to the engine and coupled to the at least one of the at least two ground engaging devices powered by the engine;
an electrical center supported by the frame and positioned above the continuously variable transmission, the electrical center including a plurality of electrical components grouped together in a centralized location and includes a controller configured to control operation of the engine and an ignition source;
a cover which is moveable between a first position blocking access to the controller and the ignition source and a second position permitting access to the controller and the ignition source; and
an exhaust system coupled to the engine for removing hot gases from the engine and dispelling the hot gases remote from the engine, wherein the electrical center is positioned on a first side of a centerline of the vehicle and the exhaust system dispels the hot gases on a second side of the centerline of the vehicle.

12. A vehicle including:
a frame;
at least two ground engaging devices supporting the frame;
a seat supported by the frame;
an engine supported by the frame and providing power to at least one of the at least two ground engaging devices;
an electrical center supported by the frame, the electrical center including a plurality of electrical components grouped together including a controller configured to control operation of the engine and an ignition source; and
an exhaust system coupled to the engine for removing hot gases from the engine and dispelling the hot gases remote from the engine, wherein the electrical center is positioned on a first side of a centerline of the vehicle and the exhaust system dispels the hot gases on a second side of the centerline of the vehicle.

13. The vehicle of claim 12, wherein the at least two ground engaging members includes a first ski positioned on the first side of the centerline, a second ski positioned on the second side of the centerline, and an endless belt straddling the centerline.

14. The vehicle of claim 13, further comprising a CVT coupling the engine to the endless belt, wherein the electrical center is positioned directly above a clutch guard member, the clutch guard member being positioned directly above the CVT, the electrical center being positioned under a cover.

* * * * *